United States Patent
Phillips et al.

(10) Patent No.: US 6,584,052 B1
(45) Date of Patent: Jun. 24, 2003

(54) METHOD AND APPARATUS FOR CONTROLLING THE FOCUS OF A READ/WRITE HEAD FOR AN OPTICAL SCANNER

(75) Inventors: Edward Alan Phillips, Great Falls, VA (US); Newell Convers Wyeth, Oakton, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/088,781

(22) Filed: Jun. 2, 1998

(51) Int. Cl.⁷ .............................................. G11B 5/55
(52) U.S. Cl. .................... 369/53.28; 369/53.1; 359/205
(58) Field of Search .......................... 358/475, 474, 358/504; 359/205; 356/318; 250/227.26, 227.28; 385/28, 15, 116, 115; 369/121, 44.25, 44.14, 53.28, 53.12, 44.32, 53.1

(56) References Cited

U.S. PATENT DOCUMENTS

| | | | |
|---|---|---|---|
| 3,112,360 A | 11/1963 | Gregg | |
| 3,220,013 A | 11/1965 | Harris | 347/260 |
| 3,892,468 A | 7/1975 | Dunguay | |
| 3,941,927 A | 3/1976 | Russell | 359/196 |
| 4,058,736 A | 11/1977 | Takahashi et al. | |
| 4,090,206 A | 5/1978 | Pfeifer et al. | |
| 4,135,083 A | 1/1979 | Van Alem et al. | |
| 4,193,091 A | 3/1980 | Kleuters et al. | |
| 4,234,788 A | 11/1980 | Palmer et al. | |
| 4,283,777 A | 8/1981 | Miyazawa | 369/44.26 |
| 4,286,145 A | 8/1981 | Palmer | |
| 4,337,531 A | 6/1982 | Willemsen | |
| 4,460,989 A | 7/1984 | Russell | 369/44.25 |
| 4,482,986 A | 11/1984 | Noda et al. | |
| 4,500,204 A * | 2/1985 | Ogura | 356/318 |
| 4,507,765 A | 3/1985 | Suzuki et al. | |
| 4,544,259 A | 10/1985 | Kanaoka et al. | 355/1 |
| 4,564,268 A | 1/1986 | Tatsuno et al. | |
| 4,566,015 A | 1/1986 | MacKenzie | 347/242 |
| 4,572,949 A | 2/1986 | Bowers et al. | |

(List continued on next page.)

FOREIGN PATENT DOCUMENTS

| | | |
|---|---|---|
| DE | 37 17 604 | 4/1990 |
| DE | 44 01 972 A1 | 7/1995 |
| DE | 44 01 972 | 7/1995 |
| EP | 0 092 420 | 10/1983 |
| EP | 0 646 908 | 4/1995 |
| EP | 0 784 314 | 7/1997 |
| WO | WO 88/03293 | 5/1988 |
| WO | WO 95/25971 | 9/1995 |

OTHER PUBLICATIONS

"Miniature Micro–Optical Scanners", Optical Engineering, vol. 33, No. 11, Nov. 1, 1994, pp. 3616–3623 (Motamedi, M.E. et al).

Patent Abstracts of Japan, vol. 013, JP 01 152683 A, Jun. 15, 1989.

Abstract of D.E. Brei and J. Blechschmidt, "Design and Static Modeling of a Semicircular Polymeric Piezoelectric Microactuator", (JMEMS, vol. 1, No. 3, p. 106).

(List continued on next page.)

*Primary Examiner*—Cheukfan Lee
(74) *Attorney, Agent, or Firm*—Banner & Witcoff, Ltd.

(57) ABSTRACT

A controller for a scanning head images light from the scanning head onto a target surface for reading and writing data. Light returned from the target surface is received by the same aperture. Light may be conducted from the aperture, for example, by a light waveguide leading to a detector. The focus control of the imaging optics is controlled responsively to the light returned through the aperture. When this returned light is at a maximum, the focusing optics are in focus. A focus controller may be programmed to dither (intentionally vary) the configuration of the optics to determine the focus optimization direction (gradient). In an embodiment with multiple apertures, each employed to scan a respective area of the target surface (in parallel), the light from adjacent apertures is effectively rejected each other aperture thereby eliminating crosstalk.

21 Claims, 8 Drawing Sheets

U.S. PATENT DOCUMENTS

| | | |
|---|---|---|
| 4,660,094 A | 4/1987 | Yoshimoto et al. |
| 4,737,946 A | 4/1988 | Yamashita et al. |
| 4,744,073 A | 5/1988 | Sugiki |
| 4,755,668 A | 7/1988 | Davis |
| 4,763,973 A | 8/1988 | Inoue et al. |
| 4,764,738 A | 8/1988 | Fried .............................. 385/3 |
| 4,765,703 A | 8/1988 | Suzuki et al. ................... 385/8 |
| 4,767,210 A | 8/1988 | Kashyap |
| 4,771,415 A | 9/1988 | Taki |
| 4,815,807 A | 3/1989 | Kaneko et al. |
| 4,858,215 A | 8/1989 | Yano et al. |
| 4,991,160 A | 2/1991 | Premji |
| 5,001,338 A | 3/1991 | Boero |
| 5,010,346 A | 4/1991 | Hamilton et al. |
| 5,031,187 A | 7/1991 | Orenstein et al. ............. 372/50 |
| 5,070,488 A | 12/1991 | Fukushima et al. |
| 5,095,472 A | 3/1992 | Uchino et al. ........... 369/44.14 |
| 5,109,459 A | 4/1992 | Eibert et al. |
| 5,121,449 A | 6/1992 | Shiba et al. |
| 5,128,915 A | 7/1992 | Yamashita et al. |
| 5,144,604 A | 9/1992 | Sugiura |
| 5,144,616 A | 9/1992 | Yasukawa et al. |
| 5,195,152 A | 3/1993 | Gupta |
| 5,220,450 A * | 6/1993 | Iizuka ........................ 359/205 |
| 5,278,812 A | 1/1994 | Adar et al. |
| 5,289,454 A | 2/1994 | Mohapatra et al. |
| 5,293,291 A | 3/1994 | Ohki et al. |
| 5,317,148 A | 5/1994 | Gray et al. |
| 5,354,985 A | 10/1994 | Quate ........................ 250/234 |
| 5,390,157 A | 2/1995 | Revelli, Jr. |
| 5,414,785 A | 5/1995 | Bergmann ................... 385/24 |
| 5,416,881 A | 5/1995 | Ikeda |
| 5,422,469 A | 6/1995 | Bard et al. |
| 5,444,689 A | 8/1995 | Ohki et al. |
| 5,452,382 A | 9/1995 | Shionoya et al. |
| 5,465,243 A | 11/1995 | Boardman et al. ........ 369/53.29 |
| 5,483,515 A | 1/1996 | Cheng et al. ........... 369/124.02 |
| 5,508,990 A | 4/1996 | Nagasaki et al. ...... 369/124.02 |
| 5,564,268 A | 10/1996 | Thompson ........................ 57/3 |
| 5,602,863 A | 2/1997 | Itagaki ........................ 372/50 |
| 5,661,591 A | 8/1997 | Lin et al. |
| 5,727,098 A | 3/1998 | Jacobson |
| 5,802,222 A | 9/1998 | Rasch et al. .................... 385/1 |
| 5,940,564 A | 8/1999 | Jewell .......................... 385/93 |
| 6,084,848 A | 7/2000 | Goto .......................... 369/121 |

OTHER PUBLICATIONS

Abstract of K. Minami, S. Kawamura, and M. Esashi, "Fabrication of Distributed Electrostatic Micro Actuator (DEMA)", (JMEMS, vol. 2, No. 3, p. 121 et. seq.).

Abstract of Q. Meng, M. Mehregany, and R. L. Mullen, "Theoretical Modeling of Microfabricated Beams with Elastically Restrained Supports", (JMEMS, vol. 2, No. 3, p. 128 et. seq.).

Abstract of M. Ataka, A. Omodaka, N. Takeshima, and H. Fujita, "Fabrication and Operation of Polyimide Bimorph Actuators for a Ciliary Motion System", (JMEMS, vol. 2, No. 4, p. 146).

Abstract of J.G. Smits and A. Ballato, "Dynamic Admittance Matrix of Piezoelectric Cantilever Bi–morphs", (JMEMS, vol. 3, No. 3, p. 105 et. seq.).

Abstract of J.W. Judy, R.S. Muller, and H.H. Zappe, "Magnetic Microactuation of Polysilicon Flexure Structures", (JMEMS, vol. 4, No. 4, p. 162).

Abstract of T.S. Low and W. Guo, "Modeling of a Three–Layer Piezoelectric Bimorph Beam with Hysteresis", (JMEMS, vol. 4, No. 4, p. 230).

Abstract of Yuji Uenishi, Hidenao Tanaka, and Hiro Ukita, "AlGaAs/GaAs micromachining for monolithic integration of optical and mechanical components", (Proc. SPIE vol. 2291, p. 82–91, Integrated Optics and Microstructures II, Massood Tabib–Azar; Dennis L. Polla; Ka–Kha Wong; Eds. Oct. 1994).

Scanning Device Using Fiber Optic Bimorph (Adam Thomas Drobot, Robert Courtney White). Our reference: 00479.02150, U.S. application Ser. No. 09/089,138, filed Jun. 2, 1998.

Multiple Parallel Source Scanning Device (Adam Thomas Drobot, Robert Courtney White, Newel Convers Wyeth). Our Reference: 00479.02151, U.S. application Ser. No. 09/089,137, filed Jun. 2, 1998.

Multiple Channel Data Writing Device (Adam Thomas Drobot, Robert Courtney White, Newel Convers Wyeth, Albert Myron Green). Our Reference: 00479.02152, U.S. application Ser. No. 09/089,136, filed Jun. 2, 1998.

Multiple Channel Scanning Device Using Optoelectronic Switching (Adam Thomas Drobot, Robert Courtney White, Newel Convers Wyeth). Our Reference: 00479.02153, U.S. application Ser. No. 09/088,782, filed Jun. 2, 1998.

Multiple Channel Scanning Device using Oversampling and Image Processing to Increase Throughput (Adam Thomas Drobot, Robert Courtney White, Newel Convers Wyeth, Albert Myron Green, Edward Alan Phillips). Our Reference: 00479.02155, U.S. application Ser. No. 09/088,780, filed Jun. 2, 1998.

Patent Abstracts of Japan, vol. 017, No. 626 (P–1647), Nov. 18, 1993 and JP 05 203445 A, Aug. 10, 1993.

* cited by examiner

METHOD AND APPARATUS FOR CONTROLLING THE FOCUS OF A READ/WRITE HEAD FOR AN OPTICAL SCANNER

BACKGROUND OF THE INVENTION

Various optical scanners are known for such applications as data storage, bar code reading, image scanning (surface definition, surface characterization, robotic vision), and lidar (light detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector (not shown). To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, or a lens driven galvanometrically or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally attended by high costs for mass manufacture, assembly, and alignment.

TABLE 1

Performance of Conventional Beam Deflectors for Optical Scanning.

| Parameter | Polygonal Mirrors | Galvano-Driven Mirrors | Hologons (Transmission) | Acousto-Optic Deflectors |
|---|---|---|---|---|
| Wavefront Distortion | $\lambda/8$ at 0.55 mm | $\lambda/8$ at 0.55 mm | $\lambda/6$ at 0.55 mm | $\lambda/2$ at 0.55 mm |
| area resolution (spot-widths/sec) | 25,000 (scan lens limited) | 25,000 (scan lens limited) | 25,000 (scan lens limited) | 1,000 (scan lens limited) |
| cross-axis error | 1 0 arc sec (uncorrected) | 1–2 arc sec (uncorrected) | 10 arc sec | 0 |
| Speed (spot widths/sec) | $1 \times 10^8$ | $2 \times 10^6$ | $2 \times 10^7$ | $2.8 \times 10^7$ |
| Bandwidth | 0.3–20 $\mu$m | 0.3–20 $\mu$m | monochromatic | monochromatic |
| scan efficiency | 80–100% | 65–90% | 90% | 60–80% |

(from *The Photonics Design and Applications Handbook* 1993, Laurin Publishing Co., Inc., p. H-449)

The performance parameters listed in Table 1 assume different levels of importance depending on the optical scanning application. For raster scanning to cover extended surface areas, the emphasis is on speed, area resolution, and scan efficiency. Wide bandwidth is needed if the surface is to be color-scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (cells) in which some optical property has been set at one of two or more values to represent digital information. Commercial read/write heads scan the media with a diffraction-limited spot, typically produced by focusing a collimated laser beam with a fast objective lens system as shown in FIG. 1. A fast objective lens, one with a high numerical aperture, achieves a small spot size by reducing Fraunhofer-type diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit cells must be followed by the spot with sufficient precision to avoid missing any bit cells. The fine tracking is achieved by servo mechanisms moving the objective lens relative to the head assembly. An auto-focus servo system is also necessary to maintain the diffraction limited spot size because the medium motion inevitably causes some change in the mean/medium separation with time. Proper focus adjustment is possible because the medium is flat and smooth. Such a surface reflects incident light in well-defined directions like a mirror. Light reflected from the medium is collected by focusing optics and sent back along the collimated beam path for detection.

Scanning by several spots simultaneously is used to achieve high data rates through parallelism in one known system called the CREO® optical tape system. One scanning device that avoids reliance on discrete optical elements to achieve scanning is described in U.S. Pat. No. 4,234,788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber as the fiber is forced back and forth repeatedly. To make the fiber wiggle back and forth an alternating electric field, generally perpendicular to the axis of the fiber, is generated. The fiber is coated with a metallic film. A charge is stored on the film, especially near the tip, by forming a capacitance with a metallized plate oriented perpendicularly to the fiber axis (optically at least partly transparent). The stored charge makes the fiber responsive to the electric field.

A drawback of this device is the limit on the speeds with which the fiber can be made to oscillate. The device requires a series of elements to move the fiber: an external field-generating structure, a DC voltage source to place charge on the fiber coating, and an AC source to generate the external field. Another drawback of this prior art mechanism is the inherent problem of stress fractures in the fiber optics. Bending the fiber repeatedly places serious demands on the materials. Problems can arise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very close to the scanned surface as may be desired for certain optical configurations.

Another prior art scanning device is described in U.S. Pat. No. 5,422,469. This patent specification describes a number of different devices to oscillate the end of an optical light guide or optical fiber. One embodiment employs a piezoelectric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezo-electric bimorph. However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

A controller for a scanning head images light emitted with a high numerical aperture from an output aperture using focusing optics with a one-to-one mapping of points in the output aperture plane onto points in the target plane. Light is conducted to the output aperture by a light guide. As a result of the one-to-one mapping ratio, light from the image is returned along the original path of the outgoing light and focused back onto the output aperture. The focus of the imaging optics are a controlled by maximizing the received light. The light guide has a directional coupler that taps received light and directs into a detector. The detector signal is applied to a control input through a low pass filter to obtain the focus control signal and applied to separate signal conditioning for data output. Alternatively, the controller could internally register itself for the possible states of received light and respond accordingly. That is, the data stream is generated and supplied to the controller along with the total amount of light. The controller, if it determines that there is an amount of light that corresponds to neither kind of data (e.g., a one or a zero), it adjusts accordingly. In this way, the same device is used for both reading the data and controlling focus.

According to an embodiment, the invention provides an optical scanning device. The device has a scanning head with a light output. A focusing element images light from the output onto a target surface. The focusing element is effective to image a first amount of return light returned from the target surface back to the output when the focusing element is properly focused and a second amount of the return light, returned from the target surface back to the output, when the focusing element is improperly focused. A detector in a return path of the light, inside the scanning head, generates an output responsive to the return light. A controller is programmed to control a configuration of the focusing element responsive to the output such that the focusing element remains properly focused by maintaining the return light at the first amount. In a variation, the scanning head includes an optical fiber or guide with the output being an end of the optical fiber or guide. In another variation, the light from the output diverges with a numerical aperture ratio of about 0.5. In still another variation, the focusing element has a 1:1 magnification. In still another variation, the scanning head includes an optical fiber and the output is an end of the optical fiber. In still another, the scanning head includes a directional coupler in series with the optical fiber or guide to divert light to the detector. In another variation, the scanning head includes multiple optical fibers or guides and the output is one of several outputs coinciding with respective ends of the optical fibers. In this embodiment, the scanning head includes directional couplers in series with the optical fibers to divert light to the detector or detectors.

According to another embodiment, the invention provides an optical scanner with a scanning head having an array of optical fibers or guides. Each fiber or guide extends to the outside of the scanning head. This results in an array of light output apertures coinciding with ends of the optical fibers or guides. Light from the output is imaged by a focusing element, with one-to-one mapping ratio, onto a target surface. The focusing element is such that the amount of return light from the target surface back to the output, when the focusing element is properly focused, is at a maximum and less when out of focus. A detector in a return path of light in the scanning head, generates an output responsive to the return light. A controller is programmed to control a configuration of the focusing element responsively to the output such that the return light is maintained at the maximum. In a variation, the light from the output diverges with a numerical aperture ratio of about 0.5. In another variation of this embodiment, the magnification of the focusing element is 1:1. In still another variation, the scanning head includes a directional coupler in series with at least one of the optical fibers or guides to divert light to the detector. The scanning head has a laser connected to direct light into the fiber or guide. According to another embodiment, the invention provides a method of controlling a focusing element of a scanning device. The method performs the following steps. Imaging, with a one-to-one mapping, an output of the scanning device onto a target surface to be read by the scanning device. Receiving light returned from an image of the output. Controlling a focus by determining a result of the step of receiving to maintain light received in the step of receiving at a maximum. According to a variation, the step of receiving includes receiving light at an input aperture which is identical to an output aperture from which the output in the step of imaging is emitted.

A light in single or multiple modes from a laser source is fed into one end of an optical fiber or waveguide designed so that this light diverges from the other end with a numerical aperture (NA) ratio determined by the fiber properties and tip configuration. A simple optical system with matching NA is used to focus the light emitted from the fiber tip to produce the desired scanning spot size. Light reflected from the scanned surface travels back along the fiber, from which it is channeled to a sensor for signal detection. The property of this system in which it re-images and collects the returned light through the fiber when the spot is focused on the scanned surface, means that an autofocus system for the scanner will use the total light returned from a given surface area as a feedback parameter. When the light returned is maximized, the system is in focus. The scanning may be achieved by moving the fiber and lens relative to the surface to be scanned. Other alternatives are moving the fiber tip relative to the optical axis and moving the lens relative to a fixed fiber tip.

DETAILED DESCRIPTION OF THE EMBODIMENT

Figure 1A:
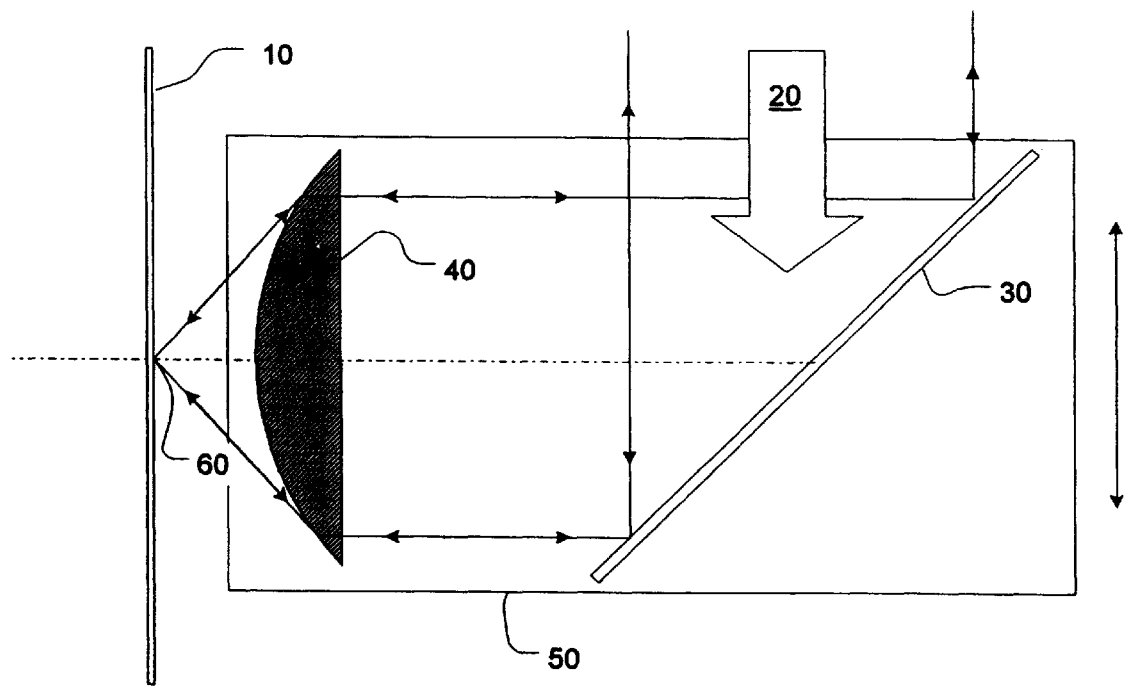
FIGS. 1A and 1B are ray trace diagrams showing scanning devices according to the prior art.
Figure 1B:
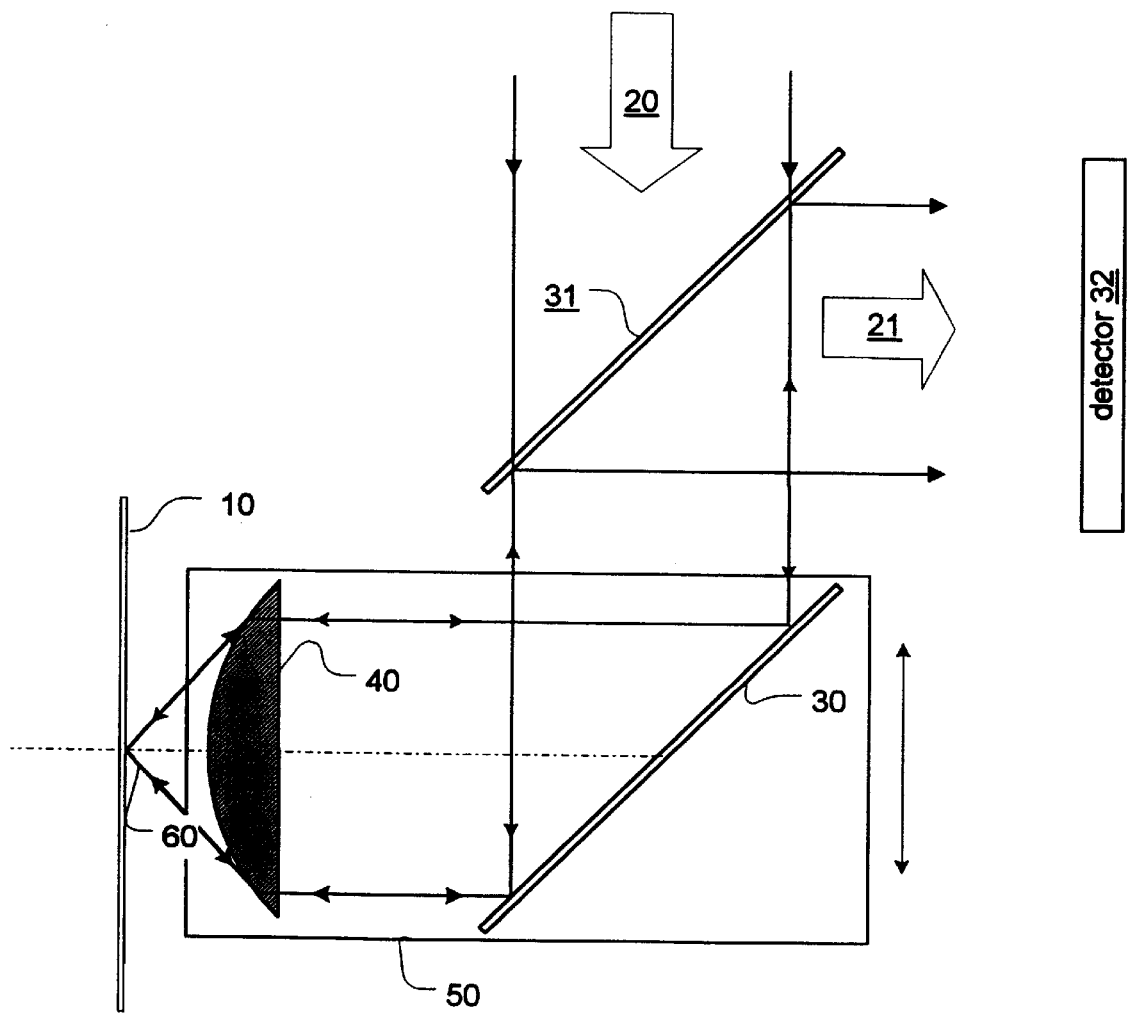
Figure 2A:
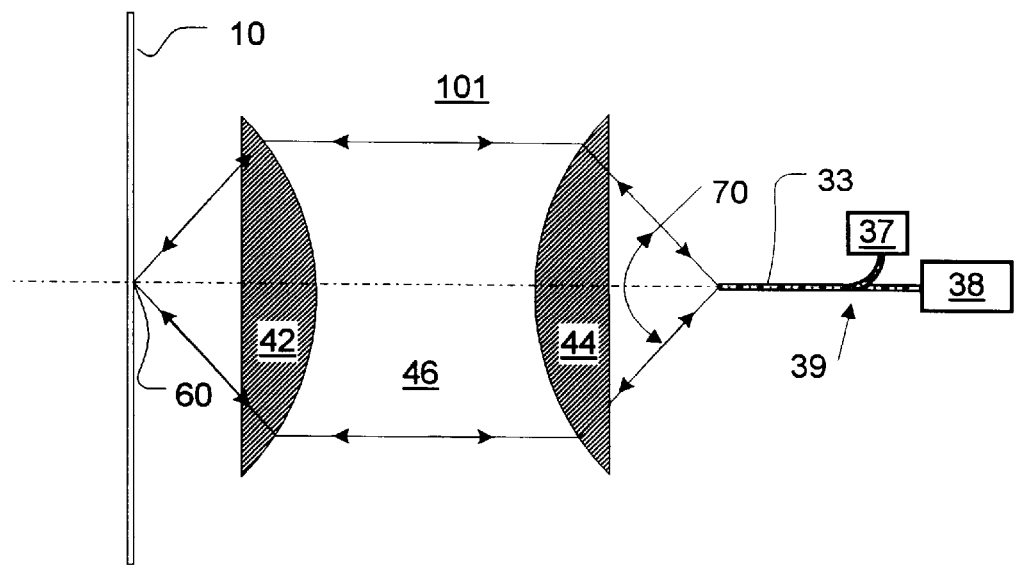
FIG. 2A is a ray trace diagram showing cantilever bimorph emitting light which is imaged onto a target surface and receiving return light from the target surface and tapped by a directional coupler and conveyed to a detector.
Figure 2B:
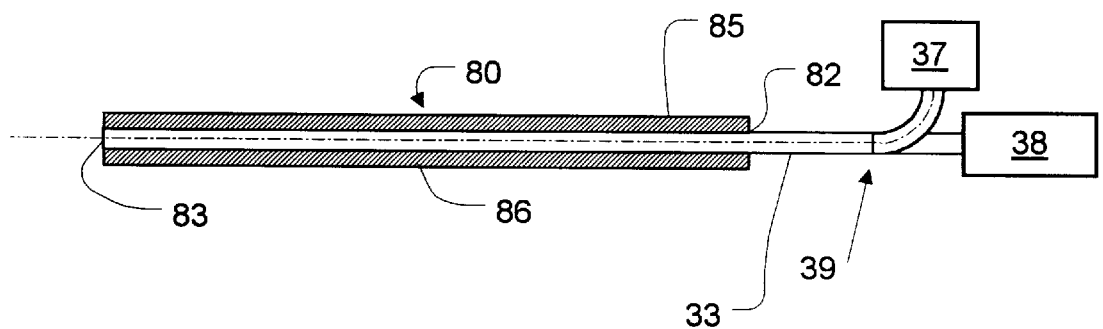
FIG. 2B is a section view of the bimorph of FIG. 2A showing, schematically, a laser source and a detector coupled to a light guide embedded therein by a directional coupler.

Referring to FIG. 2A, a scanning device 101 according to an embodiment of the invention employs a laser source 38, which could be fundamental mode or multimode. Light from the laser source 38 is fed into one end of a wave-guide, in the present embodiment, an optical fiber 33. Referring now also to FIG. 2B, optical fiber 33 may be embedded between two pieces of piezoelectric material 85 and 86 forming a bimorph/fiber element 80. The tip 83, of optical fiber 33 is constructed to cause light emitted from it to diverge with a high numerical aperture ratio; of the order of 0.5. A fast lens system 46, with lenses 42 and 44, focuses light from the tip to a diffraction-limited spot 60 on a scanned surface 10. Fiber tip 83 is positioned so that it is substantially in the focal plane that is precisely imaged by lens system 46 onto surface 10 to form a light spot 60. The effective size of the light source is the Gaussian beam waist of the fundamental mode within the fiber tip. Note that the lens system could be made from one or more holographic elements (not shown).

The highest resolution scanning applications (e.g., reading optically stored data) require that a diffraction limited spot be used with fast optics. Assuming a practical lens fabrication limit of an f-number approximately equal to 1.0 for the lens system 46, the NA required from the fiber depends on the lens system magnification, and is 0.5 for the preferred case of 1:1 magnification. To achieve this, the fiber core diameter must be on the order of the laser light wavelength. For near infrared and visible light applications, which have wavelengths in the range 0.5–1.0 $\mu$m, both lens and fiber technologies are well advanced.

When the axis of the cone of focused light is perpendicular or nearly perpendicular to the scanned surface, most of the specularly reflected light is returned to the lens, i.e. it falls within a cone defined by the spot and the lens aperture. Any light reflected from the scanned surface within this cone is collected and re-imaged by the same lens system back into the fiber tip. The returned light signal travels back along the fiber or waveguide, propagating in the direction opposite to the original light from the laser source. Before this return light reaches the source, it is diverted out of the path leading back to the source by a directional coupler 39 in the fiber/waveguide. From this coupler, the return light is channeled to a sensor 37 for signal detection.

The one-to-one mapping property of imaging systems constrain the lens system to focus back into the fiber tip all light that originates from the spot 60 on the surface illuminated by that fiber tip. In other words, the acceptance aperture of the fiber acts as an aperture stop when collecting the return light. This fact minimizes noise and crosstalk in the returned light signal because light coming from other points on the scanned surface will not be re-imaged back onto the fiber tip. When the fiber tip and scanning spot lie on the lens system axis as shown in FIGS. 2A and 2B, all specularly reflected light from the surface will be sent back into the fiber (minus losses from absorption and optical surface reflections).

Figure 3:
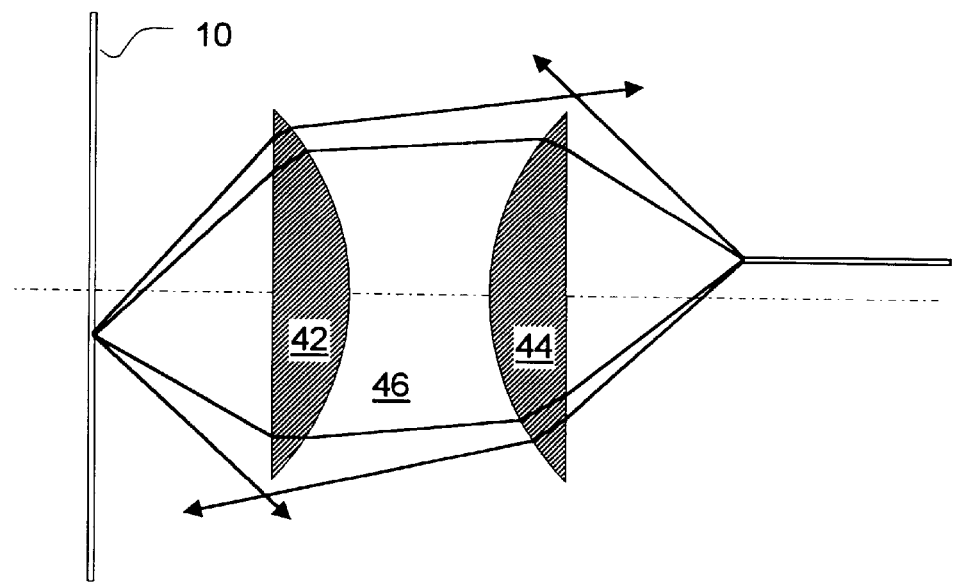
FIG. 3 illustrates spillover and vignetting effects for an off-axis source.

Referring now to FIG. 3, the arrangement will also function when the tip source is displaced from the optical axis. In this case, some of the reflected light will be lost as "spillover" by vignetting effects. The amount of light lost depends on whether the source is tilted (not shown), and can be minimized by a nearly telecentric optics design. In this off-axis case it is also more difficult for the lens system to deliver diffraction limited performance if desired. However, for small off-axis displacements, lens design calculations have shown that good system-performance (e.g., Strehl ratios of order 0.8 or higher) will be maintained.

Figure 4:
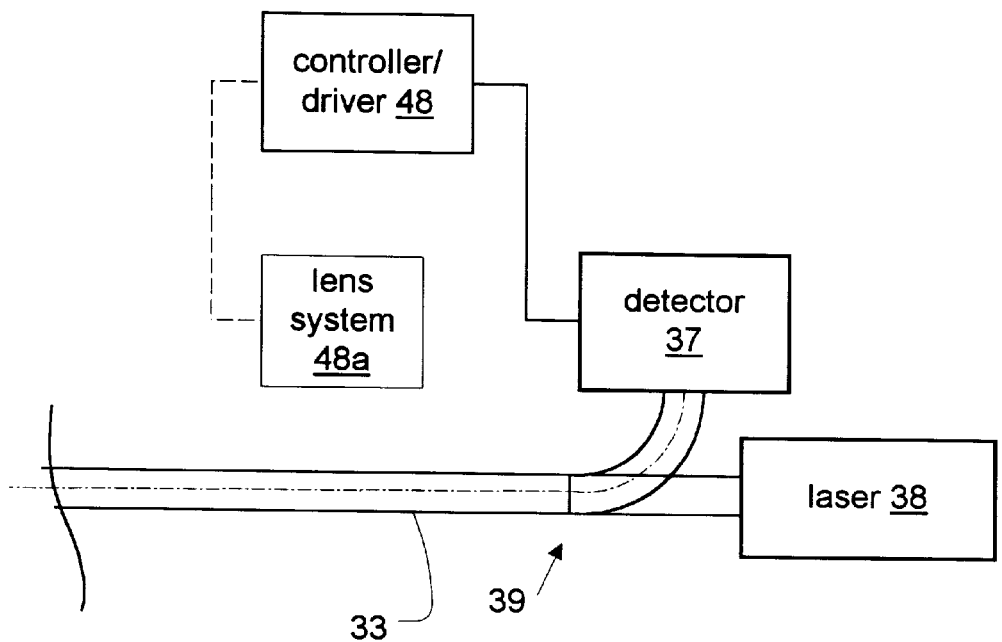
FIG. 4 is a diagram of a control scheme for maintaining focus of a lens system of the invention.

Referring now to FIG. 4, a control system exploits the property by which return light is re-imaged and collected through the emitting fiber when the spot is focused on the scanned surface. If the system is in focus, the returned light forms a small image at the fiber tip, and most of the light enters the fiber tip and is detected. If the system is not in focus, the returned light is spread out over a larger area, and a much smaller amount of light enters the fiber tip and is detected. Therefore, the system focuses can be controlled by maximizing the returned light as measured by the detector signal. A controller/driver 48 receives a signal from the detector 37 and drives the focus-adjusting mechanism 48a to maintain optimal focus. The focus adjusting mechanism (not shown in detail) may be any of a variety of mechanisms. For example, a distance between lenses of a multiple-element system could be altered. The target surface could be moved axially relative to the entire scanning head. Just the output aperture could be moved to adjust focus. If the focus is determined to be incorrect, the control system requires a signal that indicates which way to move. In an embodiment of the invention, such a signal can be found by dithering (deliberately varying) the focus adjustment by a small amount and measuring changes in the return signal that are correlated with the dither variation.

Figure 5:
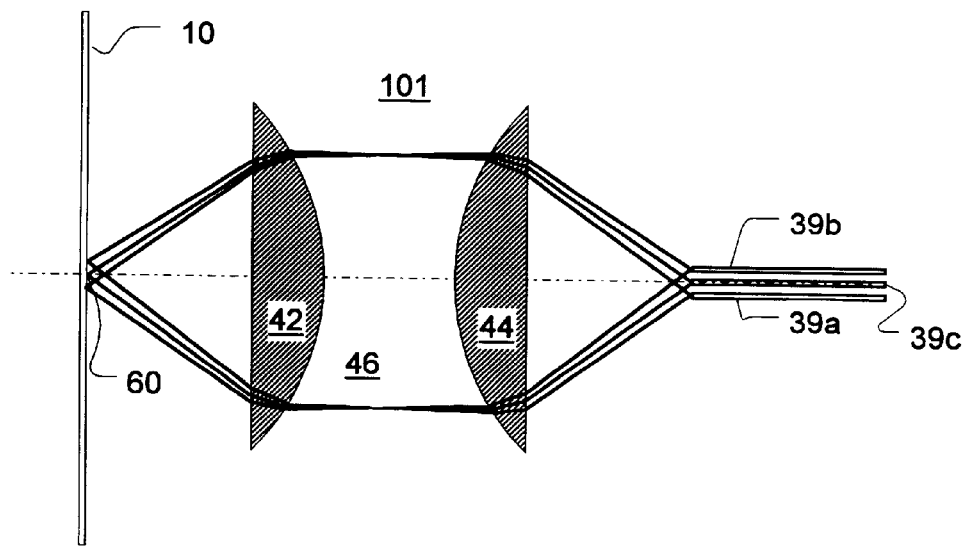
FIG. 5 illustrates the use of several light guides operating in parallel on adjoining areas of the same surface.

Referring to FIG. 5, in addition, according to another embodiment, several light guides can operate in parallel on adjoining areas of the same surface for faster data collection than a single scanner channel could achieve. In fact with a good lens design, multiple fiber sources 39a, 39b, and 39c, can be imaged onto, scanned across, and re-imaged from a surface through a single lens system. The focus control signal may be derived from one or more of the multiple data signal, or from separately placed and dedicated scanner channels (not shown but essentially as depicted for the dual-purpose channels of the embodiments pictured).

Figure 6:
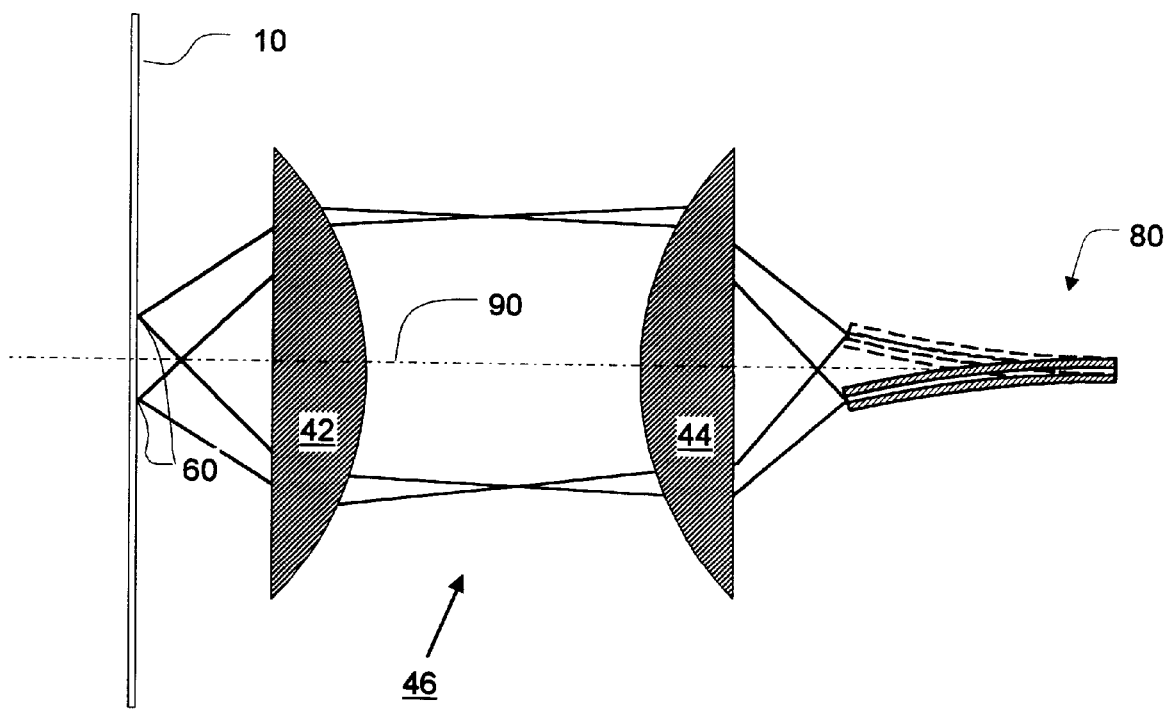
FIG. 6 is a ray trace diagram showing extreme positions of a cantilever mounted bimorph of FIG. 2A.

Referring to FIG. 6, optimally, the effective magnification of lens system 46 is 1:1. First, it is desirable to insure that the numerical aperture at the target end be as high as possible to limit Fraunhofer diffraction thereby maximizing the resolution of the projected spot. Thus a high numerical aperture at the output (scanned surface) end of the focusing optics is desirable. At the input (laser) end of the focusing optics, it is desirable to minimize the off-axis displacement of the light source. That is, it may be desirable to limit the sweep of the tip of the fiber/bimorph element 80 to limit strain on the element 80 and to limit the (longitudinal) displacement of the tip 83 relative to the plane of points that are focused onto the scanned surface 10 (a plane that is perpendicular to the optical axis 90) so the spot 60 is not out of focus at the extremes of the sweep. On the other hand it is desirable to maximize the sweep of the projected spot 60. A narrow sweep of the fiber/bimorph 80 can translate into a large sweep of the spot 60 if the focusing optics have high magnification and high quality optics. This translates to fast optics and a high numerical aperture at the input of the bimorph. Thus, according to the preferred embodiment, the focusing optics are designed with as high numerical aperture as practical at the input and output ends and thus, with approximately 1:1 magnification. In the preferred embodiment, taking into account practical issues of real-world optics, a numerical aperture of approximately 0.5 is about as high as can be achieved.

Figure 7:
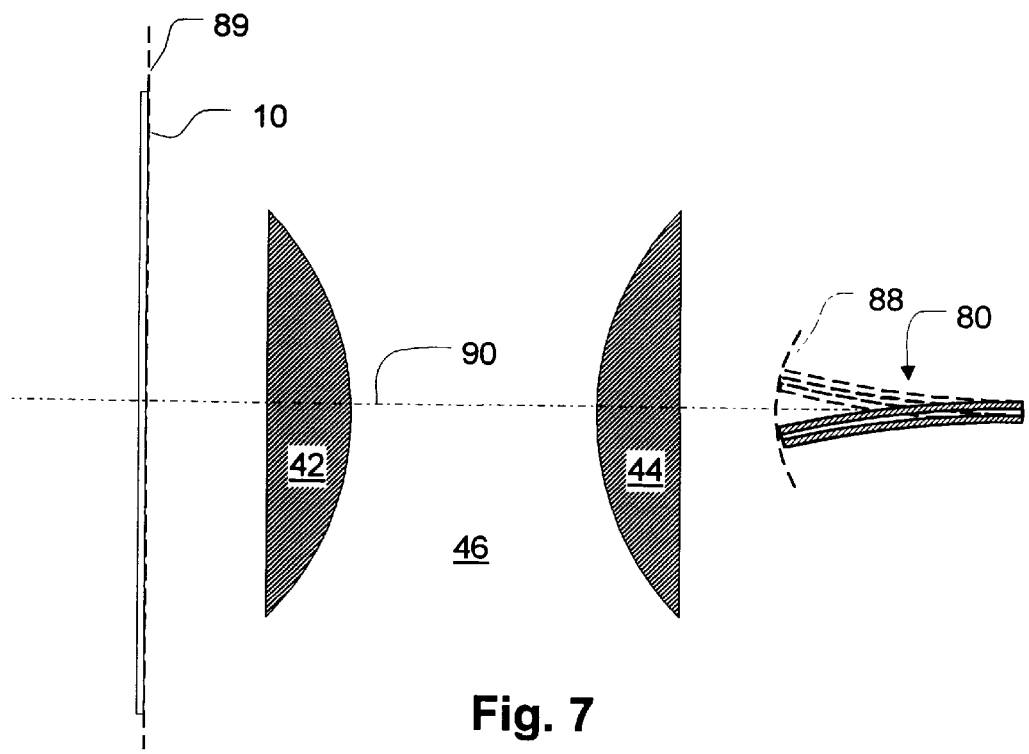
FIG. 7 is a diagram illustrating a path followed by a tip of the bimorph of FIG. 2A as the bimorph bends.

Referring to FIGS. 2B and 7, vibration of fiber 1 is achieved by embedding it in a cantilever bimorph 80 designed to bend in response to an applied stimulus such as an electric field. The piezoelectric bimorph 80 has two flat strips of piezoelectric material 85 and 86 joined lengthwise. Electrodes are attached in such a way as to induce elongation of one strip and contraction of the opposite strip when an electric field is applied. This action results in a bending motion of the unitary fiber/bimorph element 80. When the field is reversed, the bending motion is reversed in direction, causing a vibrating motion when an AC voltage is applied continuously. A 4×4 matrix relates the driving parameters to the response parameters. As bimorph 80 vibrates, the spot at the tip of fiber 1 is swept in an arc-shaped path.

Focusing error caused by the arc-shaped sweep of the fiber tip may be ameliorated not only by reducing the amplitude of the vibration of fiber/bimorph element 80, but also by the use of certain non-conventional optics. Specifically, non-conventional focusing optics may be shaped to image the locus of points defined by the curved path of sweep 88 of the fiber/bimorph element 80 tip 83 onto the plane 89 of the scanned surface 10. That is, the optics are designed such that the tip 83 remains in focus at all cross-axis positions of tip 83.

Figure 8:
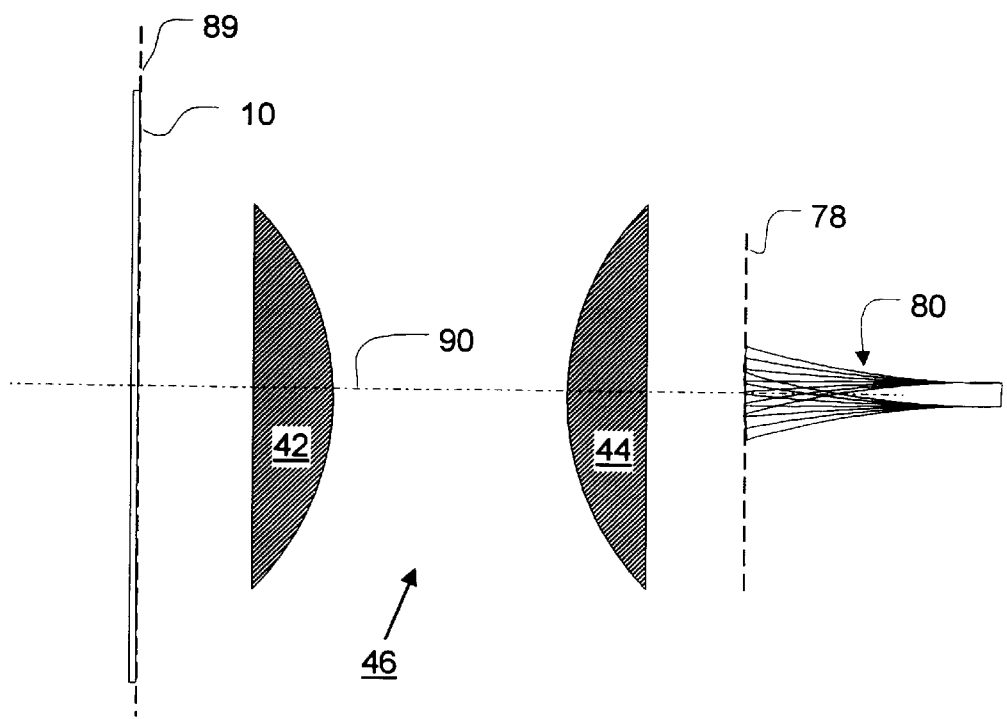
FIG. 8 is a diagram illustrating a path followed by a tip of an alternate embodiment of a bimorph which is constructed or excited such that the tip follows a straight path.

Referring to FIG. 8, still another way to ameliorate focusing error caused by the tendency of the fiber/bimorph element 80 to move axially as it bends away from the optical axis is to drive it in such a way that the tip 83 actually remains in a plane 78. This can be done in two ways or by a combination of the two. The first way is to apply voltage to the piezoelectric elements such that the elements are extended as the tip moves away from the optical axis and contracted as the tip moves toward the axis. That is, the bimorph is stretched as it moves away from the axis and compressed as it moves toward the axis. Thus, the driving voltage differential causes the bending of the fiber/bimorph element and the net driving voltage produces elongation and contraction.

Figure 9:
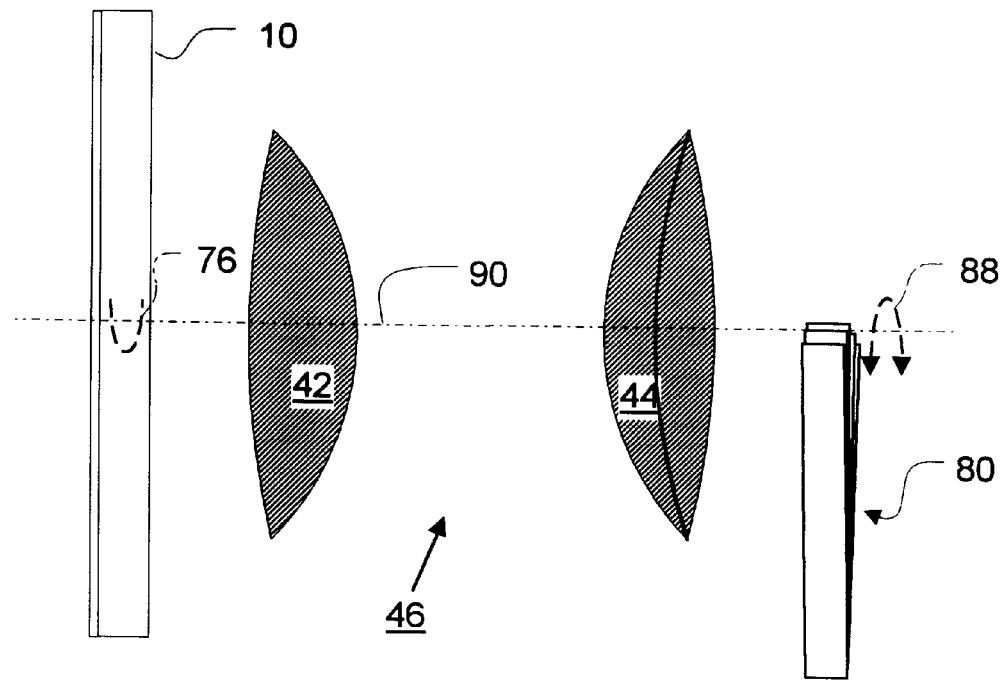
FIG. 9 is a perspective diagram showing an alternative way of cantilever-mounting a bimorph to achieve constant axial position of the tip during bending.

Referring to FIG. 9, still another way to ameliorate the focusing error caused by bending is to position the fiber/bimorph element 80 such that the arc 88 of the sweep of tip 83 lies in a plane perpendicular to the optical axis. The spots then scan a curved path 76 on the scanned surface 10. It is desirable for the surface to be written and read with the same arc-shaped sweep so that the data cells are aligned properly for both operations.

Figure 10:
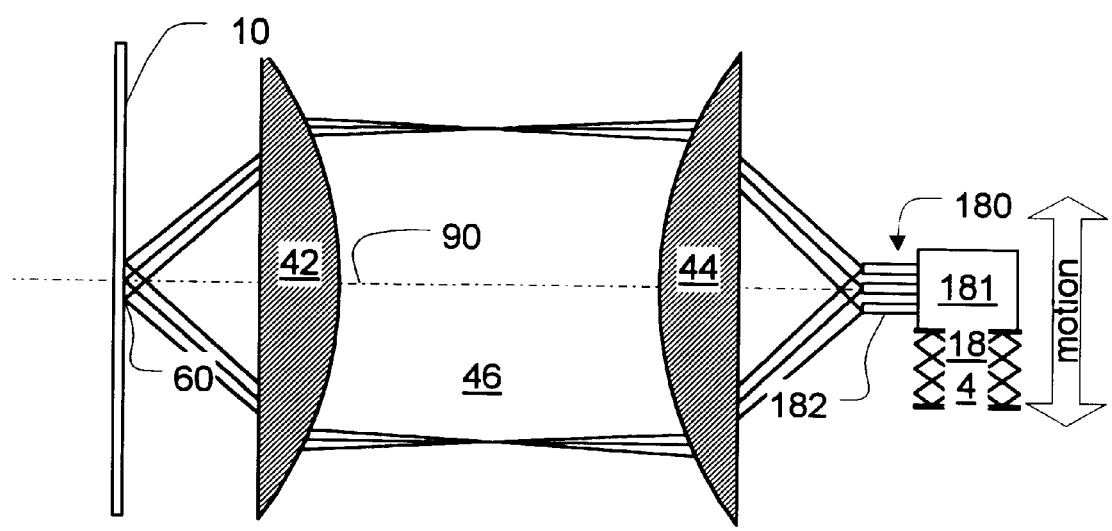
FIG. 10 is a ray trace diagram showing a multiple channel scanning head according to an embodiment of the invention, where the imaging optics are fixed and the scanning head is oscillated by a MEMS motor to scan a region of a target surface.

Referring to FIG. 10, In an embodiment of the invention, several separate light guides 182 are assembled into a single array 180 supported on a stage 181 that is oscillated by a motor 184 based on microelectromechanical systems (MEMS) technology. Preferably the light guide array is an array of optical fibers. A scanning motion of multiple spots 60 can be obtained with this arrangement. The multiple focused spots 60 will scan over the surface 10 when the light guide array 180 is oscillated relative to the optical axis 90 of the lens system. In the embodiment of FIG. 9, the lens system 46 is held fixed and the stage 181 is oscillated. In a nominal lens system with 1:1 magnification, the spots move along the surface 10 the same distance as the stage 181.

Figure 11A:
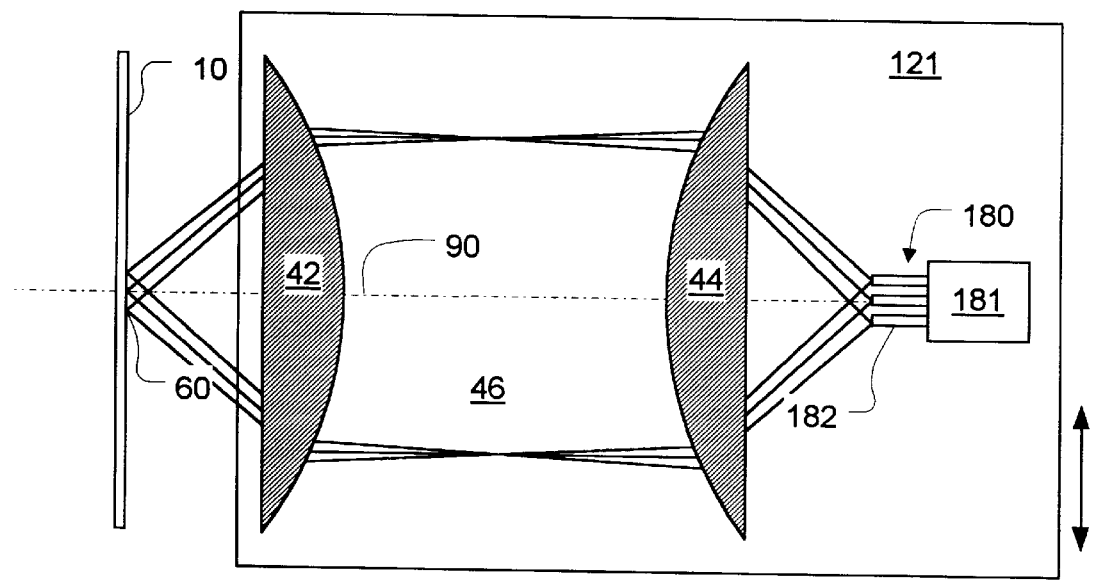
FIG. 11A is a ray trace diagram showing a multiple channel scanning head according to an embodiment of the invention, where the imaging optics and scanning head are fixedly interconnected and oscillated as a unit by a MEMS motor to scan a region of a target surface.
Figure 11B:
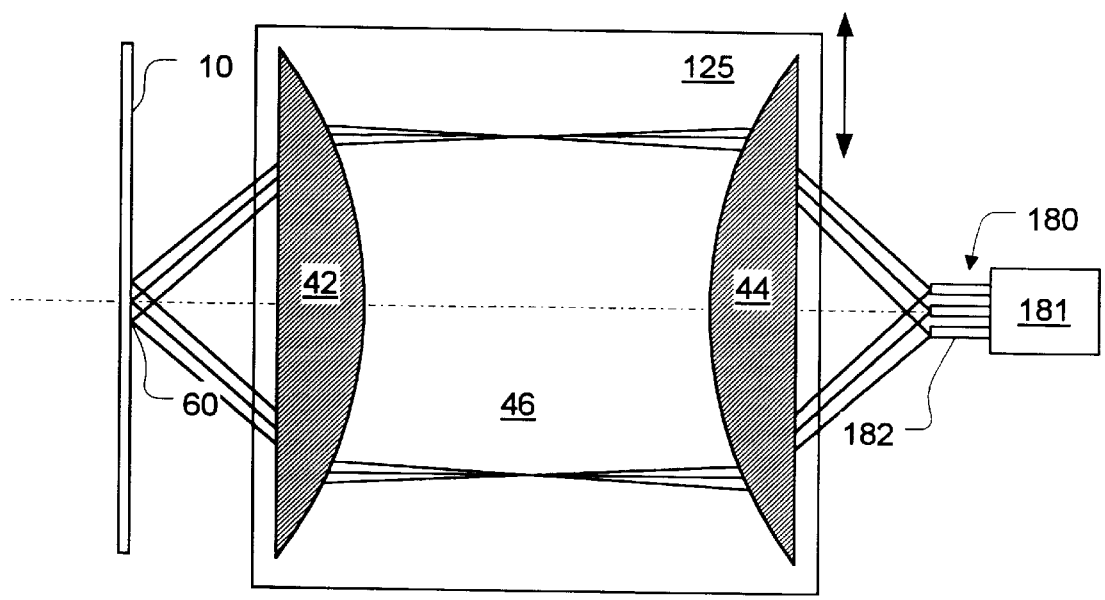
FIG. 11B is a ray trace diagram showing a multiple channel scanning head according to an embodiment of the invention, where the imaging optics are oscillated as a unit by a MEMS motor to scan a region of a target surface.

Referring to FIG. 11A, in an alternative embodiment, similar to that of FIG. 9, the focusing optics 46, as well as the light guide array 180, is oscillated. The focusing optics 46 and the light guide array are supported on a large stage 121 which is oscillated by a motor (not shown). Referring to FIG. 11B, in still another embodiment, lens system 46 is supported on stage 125 that is oscillated relative to both the scanned surface 10 and the light guide array 180. Preferably, the lens system is oscillated to cause a rotary motion since a purely lateral oscillation would not produce the same degree of oscillation in the focused spots 60.

Note that the return light aperture does not have to be the same as the output aperture in order to achieve focusing control. However, the use of imaging optics (46 in FIGS. 2 to 6) bring the specularly reflected return light back to the output aperture, and using a return aperture that is not the output aperture may be more complicated. Note also that the detected return light signal may be sent through a low-pass filter to obtain an average signal to control focus. Alternatively, a sample-and-hold technique can be used to obtain a control signal to control reflectivity, and is correspondingly insensitive to data patterns that may be in the field of view.

Note that various embodiments could make use of the same lasers for both reading and writing, as discussed above. In such a case, a head could have separate exit apertures for reading and for writing, or have one set of apertures serving both functions.

The respective entireties of the following United States patent applications, filed concurrently herewith, are hereby incorporated by reference in the present application:

Scanning Device Using Fiber Optic Bimorph (Adam Thomas Drobot, Robert Courtney White)

Multiple Parallel Source Scanning Device (Adam Thomas Drobot, Robert Courtney White, Newel Convers Wyeth)

Multiple Channel Data Writing Device (Adam Thomas Drobot, Robert Courtney White, Newel Convers Wyeth, Albert Myron Green)

Multiple Channel Scanning Device Using Optoelectronic Switching (Adam Thomas Drobot, Robert Courtney White, Newel Convers Wyeth)

Method and Apparatus for Controlling the Focus of a Read/Write Head for an Optical Scanner (Edward Alan Phillips, Newel Convers Wyeth)

Multiple Channel Scanning Device Using Oversampling and Image Processing to Increase Throughput (Adam Thomas Drobot, Robert Courtney White, Newel Convers Wyeth, Albert Myron Green, Edward Alan Phillips)

The respective entireties of the following references are hereby incorporated by reference in the present application:

M. Ataka, A. Omodaka, N. Takeshima, and H. Fujita, "Fabrication and Operation of Polyimide Bimorph Actuators for a Ciliary Motion System", JMEMS, Volume 2, No. 4, page 146.

D. E. Brei and J. Blechschmidt, "Design and Static Modeling of a Semicircular Polymeric Piezoelectric Microactuator", JMEMS, Volume 1, No. 3, page 106.

J. W. Judy, R. S. Muller, and H. H. Zappe, "Magnetic Microactuation of Polysilicon Flexure Structures", JMEMS, Volume 4, No. 4, page 162.

T. S. Low and W. Guo, "Modeling of a Three-Layer Piezoelectric Bimorph Beam with Hysteresis", JMEMS.

Q. Meng, M. Mehregany, and R. L. Mullen, "Theoretical Modeling of Microfabricated Beams with Elastically Restrained Supports", JMEMS, Volume 2, No. 3, page 128 et. seq.

K. Minami, S. Kawamura, and M. Esashi, "Fabrication of Distributed Electrostatic Micro Actuator (DEMA)", JMEMS, Volume 2, No. 3, page 121 et. seq.

J. G. Smits, and A. Ballato, "Dynamic Admittance Matrix of Piezoelectric Cantilever Bimorphs", JMEMS, Volume 3, No. 3, page 105 et. seq.

Yuji Uenishi, Hedeno Tanaka, and Hiroo Ukita, NTT Interdisciplinary Research Laboratories (Tokyo, Japan), "AlGaAs/GaAs micromachining for monolithic integration of optical and mechanical components", Optical power driven cantilever resonator. Proceedings SPIE et. seq.

What is claimed is:

1. An optical scanning device, comprising:
a scanning head with a light output;
a focusing element to image light from said output onto a target surface;
said focusing element being effective to image a first amount of return light returned from said target surface back to said output when said focusing element is properly focused;
said focusing element being effective to image a second amount of said return light returned from said target surface back to said output when said focusing element is improperly focused;
a detector in a return path of light in said scanning head, said detector generating an output responsive to said return light;
a controller programmed to control a configuration of said focusing element responsive to said output such that said focusing element remains properly focused by maintaining said return light at said first amount; and
wherein said first amount of return light is different from said second amount of return light.

2. A device as in claim 1, wherein said scanning head includes an optical fiber and said output is an end of said optical fiber.

3. A device as in claim 1, wherein said light from said output diverges with a numerical aperture ratio of about 0.5.

4. A device as in claim 3, wherein a magnification of said focusing element is 1:1.

5. A device as in claim 1, wherein a magnification of said focusing element is 1:1.

6. A device as in claim 1, wherein:
said scanning head includes an optical fiber and said output is an end of said optical fiber;
said scanning head includes a directional coupler in series with said optical fiber to divert light to said detector.

7. A device as in claim 6, wherein said scanning head has a laser connected to direct light into said fiber.

8. A device as in claim 1, wherein said scanning head has a laser connected to direct light to said output.

9. A device as in claim 1, wherein:
said scanning head includes optical fibers and said output is one of several outputs coinciding with respective ends of said optical fibers;
said scanning head includes directional couplers in series with said optical fibers to divert light to said detector.

10. An optical scanning device, comprising:
a scanning head with an array of optical fibers, each extending to an outside of said scanning head, resulting in an array of light output apertures coinciding with ends of said optical fibers;
a focusing element with one-to-one mapping ratio to a target surface on which light from said output is imaged;
said focusing element being such that an amount of return light returned from said target surface back to said output when said focusing element is properly focused is at a maximum;
said focusing element being such that an amount of return light returned from said target surface back to said output when said focusing element is improperly focused is less than said maximum;
a detector in a return path of light in said scanning head, said detector generating an output responsive to said return light;
a controller programmed to control a configuration of said focusing element responsive to said output such that said return light is maintained at said maximum.

11. A device as in claim 10, wherein said light from said output diverges with a numerical aperture ratio of about 0.5.

12. A device as in claim 11, wherein a magnification of said focusing element is 1:1.

13. A device as in claim 11, wherein said scanning head includes a directional coupler in series with at least one of said optical fibers to divert light to said detector.

14. A device as in claim 13, wherein said scanning head has a laser connected to direct light into said fiber.

15. A device as in claim 10, wherein a magnification of said focusing element is 1:1.

16. A method of controlling a focus of a scanning device comprising the steps of:

imaging, with a one-to-one mapping, an output of said scanning device through a focusing element and onto a target surface to be read by said scanning device;

receiving, at an aperture, light returned from the target surface; and controlling a focus by adjusting a position of said focusing element to maintain the returned light at a maximum.

17. The method of claim 16, wherein said output passes through said aperture in said imaging step.

18. An optical scanning device, comprising:

a scanning head with an array of light guides, each extending to an aperture from which light injected into said each of said array is emitted;

a focusing element for focusing light onto a target surface;

said focusing element and said apertures being such that light returned from said target surface back to said each of said apertures is rejected when said return light is light reflected from one of said array other than said each; and a detector in a return path of light from said each of said apertures, said detector generating an output responsive to said return light.

19. An optical scanning device, comprising:

a scanning head with a light output aperture;

a focusing element to image light from said output aperture onto a target surface;

said focusing element being effective to image a first amount of return light returned from said target surface back to said output aperture when said focusing element is properly focused;

said focusing element being effective to image a second amount of said return light returned from said target surface back to said output aperture when said focusing element is improperly focused;

a detector in a return path of light from said output aperture, said detector generating an output responsive to said return light;

a controller programmed to vary a configuration of said focusing element to determine a direction of a change of said configuration that corresponds to a proper focus in a first step, and responsively to so determining a direction, to systematically change in said direction to bring said configuration to said proper focus; and wherein said first amount of return light is different from said second amount of return light.

20. An optical scanning device comprising:

a focusing element having an optical axis;

an optical fiber having an output end optically coupled to said focusing element;

a plurality of piezoelectric elements coupled to said output end of said optical fiber;

a voltage source connected to said plurality of piezoelectric elements supplying voltage to said piezoelectric elements to cause said output end of said optical fiber to move along a plane perpendicular to said optical axis.

21. An optical scanning device comprising:

a focusing element having an optical axis;

an optical fiber having an output end optically coupled to said focusing element;

a piezoelectric element coupled to said output end of said optical fiber;

a voltage source connected to said piezoelectric element supplying voltage to said piezoelectric element to cause said output end of said optical fiber to move relative to said optical axis while remaining the same distance from said focusing element.

\* \* \* \* \*